United States Patent [19]

Brown

[11] 4,111,610

[45] Sep. 5, 1978

[54] WAVE-POWERED, PIVOTED FLOAT PUMPING SYSTEM WITH INCREASING OPPOSITION TO EXTREME MOVEMENT OF LEVER ARM

[76] Inventor: Henry C. Brown, 410 Crusader Dr., Dallas, Tex. 75221

[21] Appl. No.: 826,074

[22] Filed: Aug. 19, 1977

Related U.S. Application Data

[63] Continuation-in-part of Ser. No. 475,453, Jun. 3, 1974, abandoned.

[51] Int. Cl.² .................. F04B 17/00; F04B 35/00
[52] U.S. Cl. ...................... 417/332; 60/506; 290/53
[58] Field of Search ............ 417/330, 331, 332, 333; 60/495, 497, 498, 504, 505, 506, 507, 398; 92/131; 73/317; 74/41; 290/42, 53

[56] References Cited

U.S. PATENT DOCUMENTS

| 429,617 | 6/1890 | Gray | 417/331 |
|---|---|---|---|
| 617,249 | 1/1899 | Hartman | 74/41 |
| 793,497 | 6/1905 | Ariztia | 417/330 |
| 817,347 | 4/1906 | Starr | 60/506 |
| 855,258 | 5/1907 | Neal | 417/332 |
| 998,756 | 7/1911 | Dean | 417/330 |
| 1,377,895 | 5/1921 | Long | 92/131 |
| 2,009,939 | 7/1935 | Massey | 60/498 |
| 3,487,228 | 12/1969 | Kriegel | 60/497 |

Primary Examiner—Carlton R. Croyle
Assistant Examiner—Thomas I. Ross
Attorney, Agent, or Firm—James M. Cate

[57] ABSTRACT

A wave powered pumping system of a type adapted for installation in a body of water subject to surface wave motion. A support structure is adapted to be mounted within the body of water, and a float is connected to a reciprocal structure which is movably connected to the support structure for permitting the float to rise and fall upon the water surface in response to wave motion. A load is driven by the reciprocal structure, and apparatus is provided which opposes free movement of the reciprocal structure toward two positional extremes for minimizing the likelihood of damage to the pumping system which would otherwise occur during severe weather conditions.

3 Claims, 6 Drawing Figures

WAVE-POWERED, PIVOTED FLOAT PUMPING SYSTEM WITH INCREASING OPPOSITION TO EXTREME MOVEMENT OF LEVER ARM

This is a continuation-in-part of co-pending application Ser. No. 475,453 entitled "Wave Powered Pumping System" filed June 3, 1974, now abandoned.

This invention relates to energy system and, more particularly, to a wave powered pumping system having a float structure connected to a reciprocal member.

It has long been recognized that the wave motion present in large bodies of water represents a substantially unlimited source of energy which, if efficiently utilized, can supply electrical and other forms of power without many of the disadvantages inherent in the generation of energy from fossil fuels. Production of energy by the combustion of fossil fuels results in undesirable pollution of the environment, and the mining of coal and other fuels often results in harmful effects to the land. Moreover, there is concern that supplies of readily obtainable fossil fuels are limited and that the obtaining and processing of such fuels in the future will be difficult and increasingly costly. In contrast, energy produced by harnessing tide and wave motion does not require the depletion of a natural resource and does not involve the environmental problems inherent in the production and consumption of fossil fuels. As to the cost factor, it will be apparent from the following description that substantial, continuing costs such as those required in the production and utilization of fossil fuels are avoided by the present system. That is, the energy provided by natural wave and tide movement is basically free, and the only substantial continuing costs are those related to the maintenance of the pumping and energy conversion systems and those related to property leasing or ownership. As will further become apparent, a major object of this invention is the reduction of necessary maintenance of the pumping system to an absolute minimum.

In the past, energy systems powered by the surface movement of a body have been of two main types. The first consists of those systems which employ the displacement of structures floating upon the water surface as the surface is vertically displaced by tide movement. The second approach is to employ the more frequent, vertical displacements caused by wave movement to produce vertical, reciprocal movement of a float and associated components. Because tide movements occur only a few times per day, the floating structures used to harness tide movement must necessarily be of very large proportions if substantial energy is to be obtained. Thus, the energy derived from such a tide powered system during one tide cycle is limited by the buoyancy of the floating structure and the vertical displacement of the water surface, so that large amounts of energy may only be obtained by the use of extensive systems of large floating structures such as barges or the like, each of which must be secured and protected from tide, wind, and storm damage. The construction of such massive floating structures and their safe installation in tidal, ocean waters is a difficult and expensive project, and tide powered energy systems have not enjoyed widespread acceptance.

Several of the above-mentioned problems are avoided in the energy conversion systems deriving most of their motive force from wave movement, as distinguished from tide movement. Because ocean wave cycles typically occur several times a minute rather than only several times per day, smaller and consequentally less costly float members and associated apparatus may be employed to produce energy levels comparable to those produced by very large and expensive tide powered systems. Ocean waves may often be several feet in height, and can thus produce substantial and frequent vertical displacement of structures floating upon the surface and constrained from horizontal movement.

In the past, wave powered energy conversion systems have generally included a frame structure fixedly supported over a body of water, typically near an ocean shoreline. The float member is permitted to float upon the surface of the body of water and is connected to the frame by a movable structure such as a pivotable, horizontally extending beam, which permits vertical movement of the float but restrains it against substantial horizontal movement. The rocking beam or other such mechanism connected to the float is in turn operatively connected to a power conversion system operable to transform the reciprocal movement of the float into hydraulic or electrical power. Typically, a pump is employed which is actuated by the movable float and operable to transmit fluid under pressure to a hydroelectric generating station for generating electricity.

While wave powered energy conversion systems are not subject to some of the limitations and construction difficulties inherent in the larger, tide powered system, they nevertheless suffer from certain serious problems of their own. If the pumping system is to be permanently mounted in ocean waters it will be repeatedly subject to stresses produced by wave movement against both the fixed and the movable portions of the pumping apparatus. It is known that, apart from the effect of the bottom of the sea in relatively shallow water, particles of material carried within a body of water near the water surface define a generally circular path during the passage of an ocean wave. Thus, water at the surface exerts successive, oppositely-directioned forces upon structures adjacent and above the mean water level. An increase in wind speed adjacent the surface will gradually increase the average wave height until the crests of the waves begin to break, whereupon the speed of the turbulent water in the crests becomes greater than that of the wave movement itself, and the waves become capable of inflicting tremendous and damaging forces upon any structure in their path. For example, the tons of violently moving water contained in the crest of even a moderate-sized, breaking ocean wave can demolish the supersturture of a ship. During ocean storms, such wave energy at and above the mean water level increases dramatically, as huge waves develop. It has been estimated from an examination of storm damage to break-waters, piers and other such structures near ocean shorelines that wave pressures greater than 5,000 pounds per square foot have been received.

It will be apparent that wave pumps which are fixedly mounted near the shoreline, but typically in 10 to 40 feet depths, will periodically be subject to such storm damage. This is a more critical problem in the case of pumps of the wave powered type, because the float and its associated supporting structure are necessarily free to move with the waves, thereby making them susceptible to the danger of violent, damaging movement caused by turbulent waters. Because the float and its supporting structure are freely movable, rigid structural bracing is not possible. The dimensions of the movable structures and of the associated pumping apparatus are proportioned to obtain satisfactory pumping action from normal wave action in usual weather conditions, if efficient operation of the pump is to be obtained during those conditions. Because wave heights increase substantially during even mildly disturbed weather conditions, e.g. when the wind speed rises above 20–30 knots, the float of a pumping apparatus in which a full pump movement or stroke results from average wave motion will soon reach the upper and lower limits of its allowed reciprocal movement and begin to violently drive the movable elements of the pumping apparatus against any associated restraining elements. In some systems, the upward and downward movement of the float is limited by the impact of a pistion against endwalls or other stop members of an associated cyclinder. It will be apparent that the reciprocal elements of such a system would impact against any structures or mechanism limiting their movement with great momentum and kinetic energy, resulting in damage to the fixed and/or non-fixed elements. In some such systems the reciprocal element may be connected to a rotatable lever mechanism which may be overdriven and rotate 360° during such wave movement, or which may become jammed in an extreme position. A second disadvantage of such a system is that the energy present in the turbulent water is not put to beneficial use by the pump even if the pump remains undamaged by the waves, because of the limited movement of the float.

It can thus be appreciated that this susceptability to storm damage is a major limiting factor in the practical application of such wave powered pumping stations. Of course, it may be possible to employ mechanisms for locking the movable pump elements in a fixed position during abnormal weather conditions. This requires, however, that (1) workers be present at the pumps for operating the locking mechanisms, or that (2) automated or remotely controlled servo systems or the like be employed. The latter approach increases the complexity and cost of the pumping system, and presents problems with respect to the maintenance of the automated equipment itself in a severe and corrosive environment. The former approach is also undesirable from a cost standpoint, and it necessitates added safety precautions for human life, i.e., for the protection of workmen either in service boats or platforms or the like permanently installed at the pumping stations. It is thus preferable that the pumping stations be continuously and safely operable without human operators even during severe weather conditions, and that necessary maintenance of the stations be minimized so that the need for servicing by workmen during or prior to severe weather is obviated.

Further problems relating to the permanent installation of such pumping stations in ocean waters include the corrosion of metal components by ocean spray and wind, and the costs of building large platforms or supporting structures fixed to the ocean floor. If a platform or working area is to be made safe from storm damage, it is preferred that it be positioned above the level of the highest waves which are to be received to avoid damage from the tremendous forces which are exerted by such waves during storms, as has been previously discussed. This again manifolds the cost of such a pumping station.

It is, accordingly, a major object of the present invention to provide a new and improved wave powered energy system of the type having a float structure adapted to follow vertical movements of the surface of a body of water.

Another object is to provide such a system which is adapted to be fixedly mounted in ocean waters.

Yet another object is to provide such a system operable to transmit driving forces from the float structure to a load through gearing and linkage mechanisms which apply a varying mechanical advantage between the reciprocal structure and the load, the net forces resisting movement of the reciprocal structure increasing as the load approaches opposite extremes of movement.

Another object is to provide an energy generating pumping system which is adapted to be inexpensively constructed and maintained.

Another major object is to provide such a system which is inherently resistant to wave damage during severe weather conditions.

A further object is to provide such a pumping system which is continuously operable in both normal and severe weather conditions, with minimum maintenance and without the need for human operators at the pumping station.

A still further object is to provide such a pumping system which is of simple construction and of practicable and relatively inexpensive manufacture.

Other objects and advantages will be apparent from the specification and claims and from the accompanying drawing illustrative of the invention.

Figure 1:
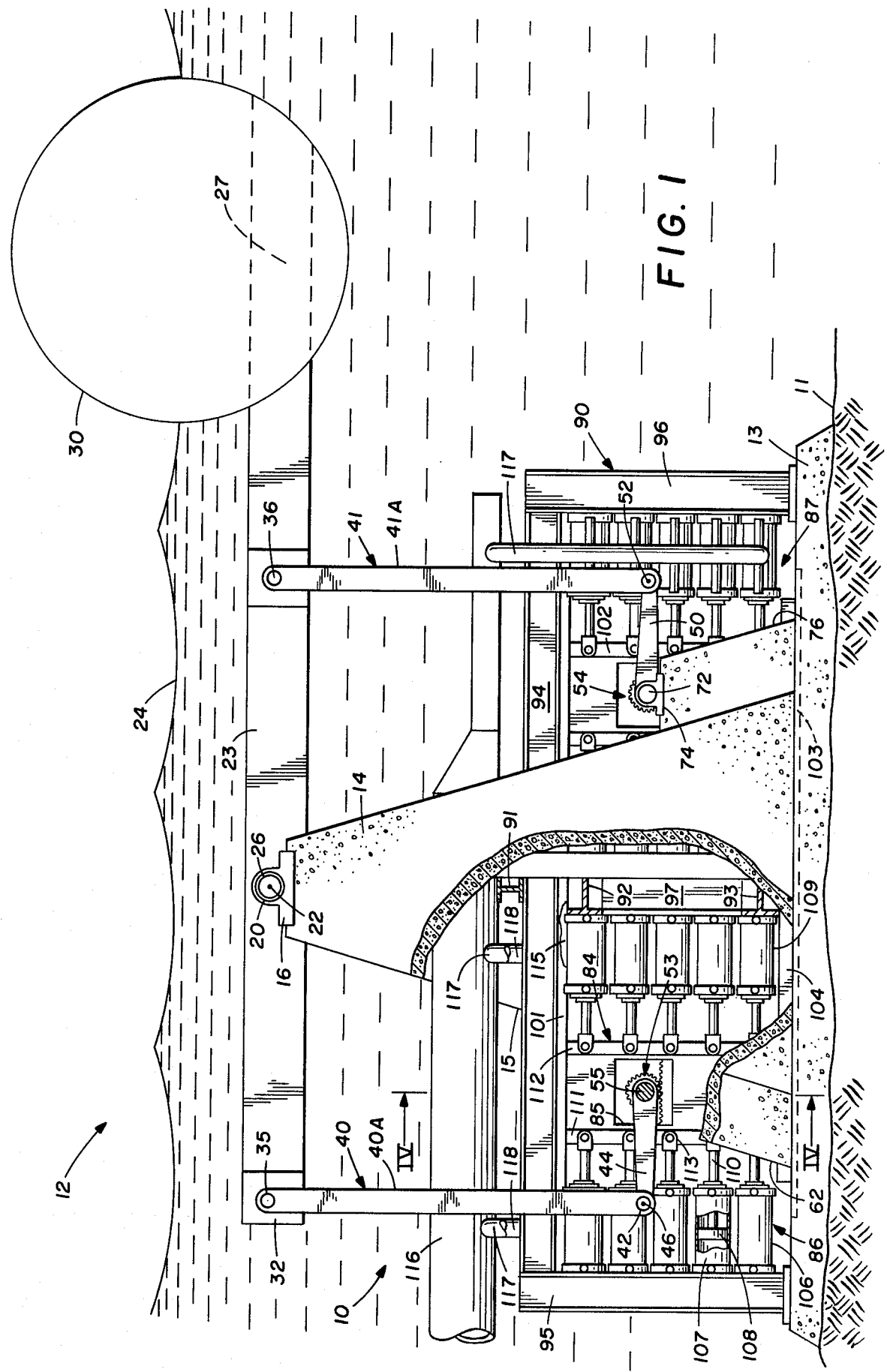
FIG. 1 is a side elevation of a pumping system constructed according to one embodiment of the present invention and fixedly mounted upon the floor of a body of water.

With initial reference to FIG. 1, the pumping apparatus 10 is adapted to be fixedly mounted on the floor 11 of a body of water 12 subject to surface wave motion and is suitably installed in about 35 feet of water near an ocean shoreline. A supporting foundation 13 for the pumping apparatus 10 is fixedly seated on the ocean floor 11, having portions, not shown, extending below the ocean floor for securely seating the foundation in place, according to practices known in the art. First and second concrete piers 14, 15 (FIG. 2) are mounted upon opposite sides of the foundation 13 and extended upwardly therefrom as upright standards, the piers 14, 15 being mutually spaced for structural strength and for accommodating therebetween portions of the pumping apparatus 10 to be described hereinbelow.

Mounted on the upper end portions of the first and second piers 14, 15 are first and second bearing yokes 16, 17. First and second bearings 20, 21 are mounted within the first and second bearing yokes 16, 17, respectively, and are extended through the first and second yokes, 16, 17 along a common, horizontally extending, central axis 22. The bearings 20, 21 are suitably sleeve type bearings of low friction, non-corrosive material. Rotatably supported by the bearings 21, 21 is a generally horizontally extending, pivotal beam 23 which is preferably positioned entirely below the average surface level 24 of the body of water 12, for reasons to be discussed in a later section. The pivotal beam 23 has a cylindrical, first transverse portion 25 through which a first horizontal axle 26 is coaxially extended, the axle 26 being rotatably journalled within the yokes 16, 17 by the first and second bearings 20, 21 to permit pivotal movement of the beam 23 about the horizontal axis 22.

The pivotal beam 23 has a first end portion 27 which is securely fastened, suitably by bolts or other means, to a float member 30 having substantial buoyancy within the water as well as having substantial weight; thus, the first end 27 of the pivotal beam 23 is raised with a substantial force as a result of the float 30 rising upon the water surface as the surface rises in a wave above the average water level 24, and the beam 23 rotates in the other direction, also with substantial force, as the weight of the float 30 pulls the first end 27 of the beam 23 downwardly when the water level falls below the average level 24. Preferably, the weight of the float 30 is approximately equal to the net buoyancy of the float within the water, i.e., the buoyancy of the float in excess of its weight when totally submerged, so that vertical forces exerted upon the water surface are approximately equal, as the beam is rotated by wave action in either direction from its medial position shown in FIG. 1. In the present embodiment, the float 30 is suitably a hollow cylinder of steel or reinforced concrete, about twelve feet in diameter, and having both a net buoyancy and weight of about 100,000 pounds. As can be most clearly seen in FIG. 2, the bearings 20 and 21 are spaced apart by a distance which is a substantial percentage (at least 15-30 percent) of the distance between the float 30 and the pivot axis 22, whereby lateral forces against the float 30 from ocean waves or currents tending to move the float horizontally, transversely of the beam 23, are efficiently resisted by the yokes 16, 17 and the supporting piers 14, 15.

The pivotal beam 23 has a second end portion 32 spaced beyond the pivot axis 22, and a cylindrical, second transverse portion 33 (FIG. 2) of the beam 23, similar to but smaller than the first transverse portion 25, is formed therein extending horizontally and transversely of the beam 23. The beam 23 has a corresponding, third transverse portion 34 between the float 30 and the pivot axis 22, the third and second transverse portions 34 and 33 being equidistantly spaced from the pivot axis 22. Rotatably journalled within the second and third transverse portions 33 and 34 are respective second and third horizontal axles 35, 36 (FIG. 1) which project beyond the associated, transverse portions 33, 34 (FIG. 2) for a small distance. The projecting portions of the second axle 35 are rigidly connected to a first walking beam structure 40 (FIG. 1) which comprises first and second, identical, downwardly extending beams 40A, 40B (FIG. 2) which are fastened to the second axle 35 on opposite sides of the second transverse portion 33. Similarly, a second walking beam structure 41 (FIG. 1) is fastened to and extends downwardly from the third horizontal axle 36, the second walking beam structure 36 correspondingly comprising first and second walking beams 41A, 41B (FIG. 2) fastened to the third axle 36 and extending downwardly therefrom. The vertical beams 40A, 40B of the first walking beam structure 40 are pivotally connected at their lower ends, by respective horizontal shafts, such as, shaft 42 (FIG. 1), to respective radius arms 44, 45 (FIG. 2) of equal length which extend horizontally, toward the second walking beam structure 41 (FIG. 1) when the pivotal beam 23 is in its medial, horizontally extending position, as will be understood from the description hereinbelow of associated supportive structures. Suitable bearings or bushings, not shown, are provided for permitting pivotal movement of the walking beam 40A relative to the radius arm 44 and of the walking beam 40B relative to the radius arm 45 upon the horizontal shafts 42, whereby the walking beam structure 40 and the radius arms 44, 45 are pivotable about a common, horizontal axis 46 (FIG. 1). Similarly, radius arms 50, 51 are respectively pivotally connected to the lower ends of the first and second walking beams 41A, 41B of the second walking beam structure 41 for permitting pivotal movement of the radius arms 50, 51 relative to the walking beams 41A, 41B about a common horizontal axis 52 (FIG. 1). The radius arms 50 (FIG. 1) and 51 (FIG. 2) extend from the second walking beam structure 41 toward the first walking beam structure 40, and are also horizontal when the pivotal beam 23 is in its medial position.

Figure 2:
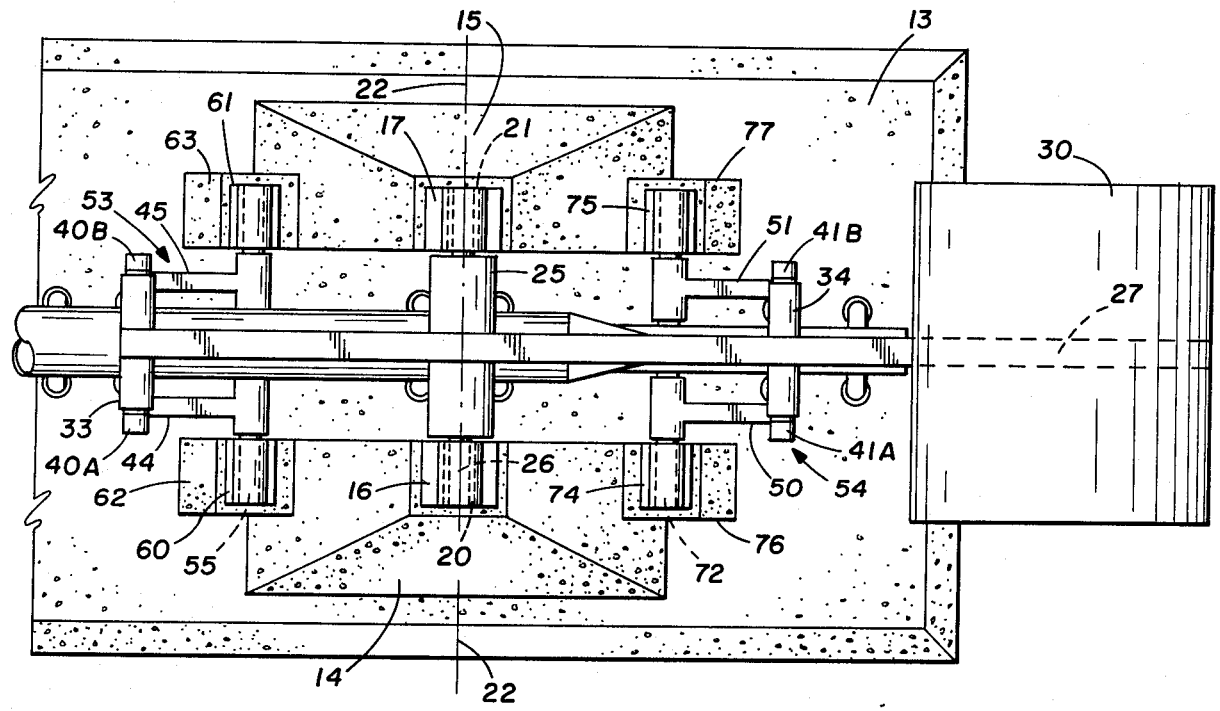
FIG. 2 is a top view of the apparatus of FIG. 1.
Figure 3:
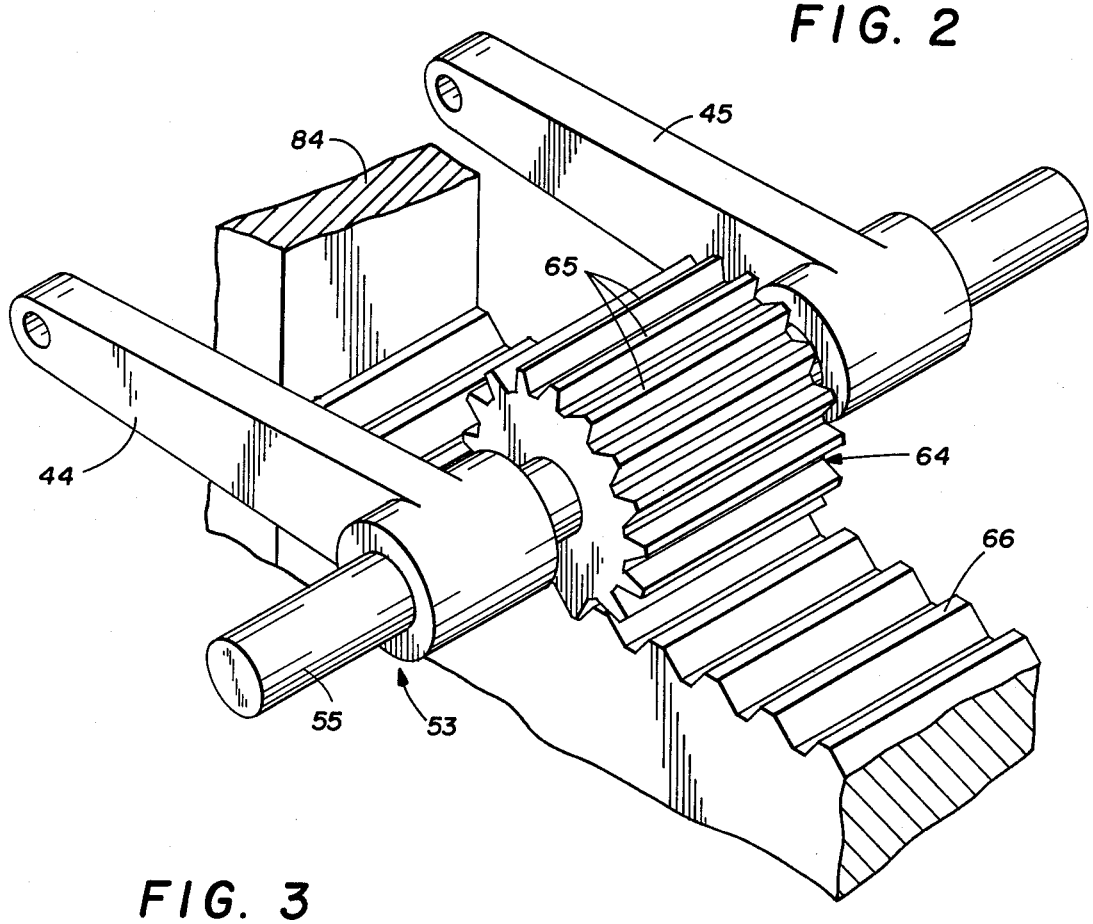
FIG. 3 is a perspective view of the crank assembly of FIG. 2 together with associated structure.

The distal end portions of the radius arms 44, 45, i.e., the end portions spaced from the walking beam structure 40, comprise a portion of a rotatable, first crank structure 53, now to be described, and the corresponding end portions of the other radius arms 50, 51 are similarly connected to, and form a part of, a second crank structure 54. Referring now primarily to FIG. 3 and with added reference to FIGS. 1 and 2, the radius arms 44, 45 are rigidly affixed to respective ends of a horizontally extending shaft 55. The shaft 55 has end portions extending outwardly beyond the radius arms 44, 45, and these portions are respectively rotatably journalled within corresponding yoke structures 60, 61 which are mounted atop second and third pier structures 62, 63 respectively (FIG. 2), which in turn are fixedly mounted on the foundation 13 as are the first and second piers 14, 15. Referring again primarily to FIG. 3, the shaft 55 extends coaxially through and is nonrotatably connected to a pinion gear 64. Laterally extending teeth 65 formed circumferentially on the gear 64 are engaged with the corresponding teeth of a rack 66 which extends linearly, horizontally, below and in vertical alignment with the pinion gear 64. The second rack structure 54 similarly includes a horizontal shaft 72 (FIG. 1) affixed to the radius arms 50, 51 (FIG. 2) and rotatably mounted within yokes 74, 75 which are mounted atop fifth and sixth pier structures 76, 77, with respect to the first crank structure 53 and with primary reference to FIG. 1, the linear rack 66 (FIG. 3) is mounted in a first, rectangular driving plate 84 and is seated upon the lower edge of a rectangular cutout portion 85 formed through the upper half of the driving plate 84. The driving plate 84 constitutes a part of a first pump assembly 86, now to be described.

Figure 4:
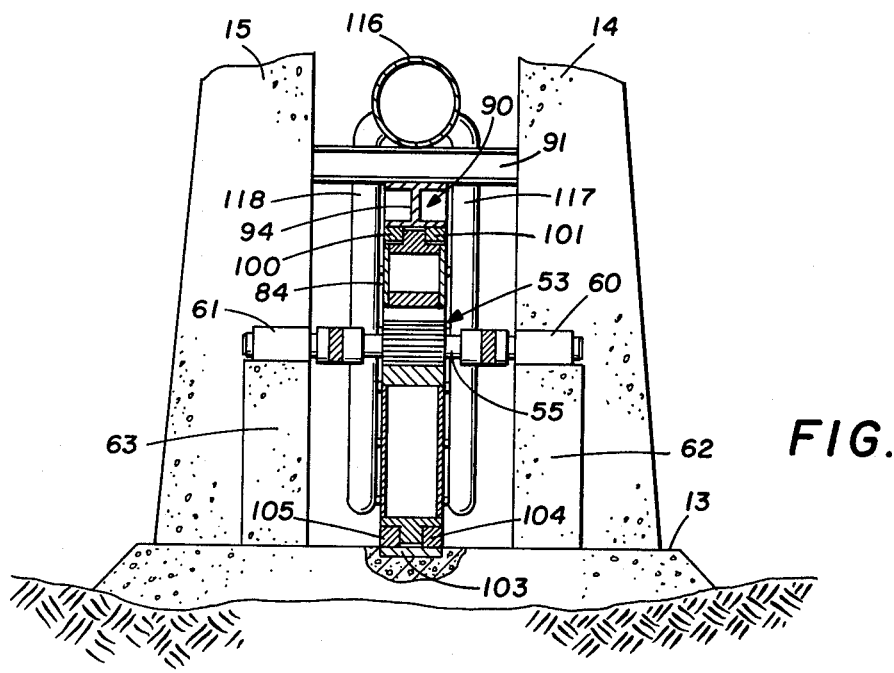
FIG. 4 is a cross-sectional view of a portion of the pump assembly of FIG. 1 taken as on lines IV—IV.

The first pump assembly 86, and a second, identical pump assembly 87 which is similarly associated with the second crank structure 54, are supported by a common framework 90. The framework 90 includes first, second, and third transverse I-beams 91, 92, and 93 which extend between the first and second pier members 14, 15 and are rigidly affixed thereto. An elongated, longitudinally extending I-beam 94 is welded to the uppermost, third transverse I-beam 91 and extends perpendicularly thereof and along a horizontal axis parallel to the pivotal beam 23 when the beam 23 is in its medial position. The longitudinal beam 94, at its end portions, is fixedly joined to the upper end portions of first and second vertical I-beams 95, 96, the lower ends of which are embedded or otherwise secured to the foundation 13. A third, central vertical I-beam 97 extends between and has end portions fixedly joined to the second and third transverse beams 92, 93. As shown in FIG. 4, the longitudinal I-beam 94 has first and second guide bars 100, 101 welded or otherwise affixed to its lower side and extending along the length of the beam 94, the guide bars 100, 101 being mutually spaced by a distance slightly larger than the thickness of the driving plate 84, and of an identical, second driving plate 102 of the second pump assembly 87 (FIG. 1). An elongated, slide strip or plate 103 is mounted on the foundation 13 directly below the driving plates 84, 102 and in vertical alignment with the longitudinal I-beam 94, and third and fourth guide bars 104, 105 (FIG. 4) are mounted on the slide plate 103 and extend in parallel alignment on either side of a projecting portion of the driving plates 84, 102. Thus, the driving plates 84, 102 are linearly slideable leftwardly and rightwardly along the grooves defined between the guide bars 100, 101 and 104, 105. With respect now to the first pump assembly 86, the pump assembly includes a first bank 106 of cylinders 107, each cylinder having one end affixed to the vertical I-beam 95 and extending therefrom toward the driving plate 84, the cylinders being arrayed one above the other in parallel alignment. Each is provided with a piston 108 affixed to a piston rod 110 extending horizontally from the cylinder 107 toward the driving plate 84. A second bank 109 of cylinders is similarly affixed to the central vertical I-beam and extends leftwardly toward the driving plate 84. The driving plate 84 is provided, on its left and right sides, with left and right vertical web portions 111, 112 thinner than the remainder of the driving plate 84, and which respectively project outwardly therefrom toward the first and second banks of cylinders 106, 109. The driving plates may be hollow, as shown in FIG. 4.

Each of the cylinder rods 110 of the first bank of cylinders 106, at its distal end portion, has a clevis portion 113 in which the web portion 111 is interdigitated, and which is bolted, pinned, or otherwise fastened to the web portion 111. The piston rods of the second bank of cylinders 109 are similarly connected to the second web portion 112 of the driving plate 84. It can now be understood that the driving plate 84 is operatively and drivingly connected to the piston rods of both banks of cylinders 106 and 109, and is slideable in either direction along the tracks formed by the guide bars 100, 101 and 104, 105, for simultaneously driving the pistons 108 within both banks of cylinders 106, 109. The second driving plate 102 is similarly slideable within the same grooves for driving the pistons of the second pump assembly 87. Preferably, the first and second driving plates 84, 102 are interconnected by a connecting beam 115 which extends horizontally along the groove between the guide bars 100, 101, and by a second connecting beam, not shown, extending between the guide bars 104, 105, whereby the first and second driving plates 84, 102 are caused to move in concert.

Figure 5:
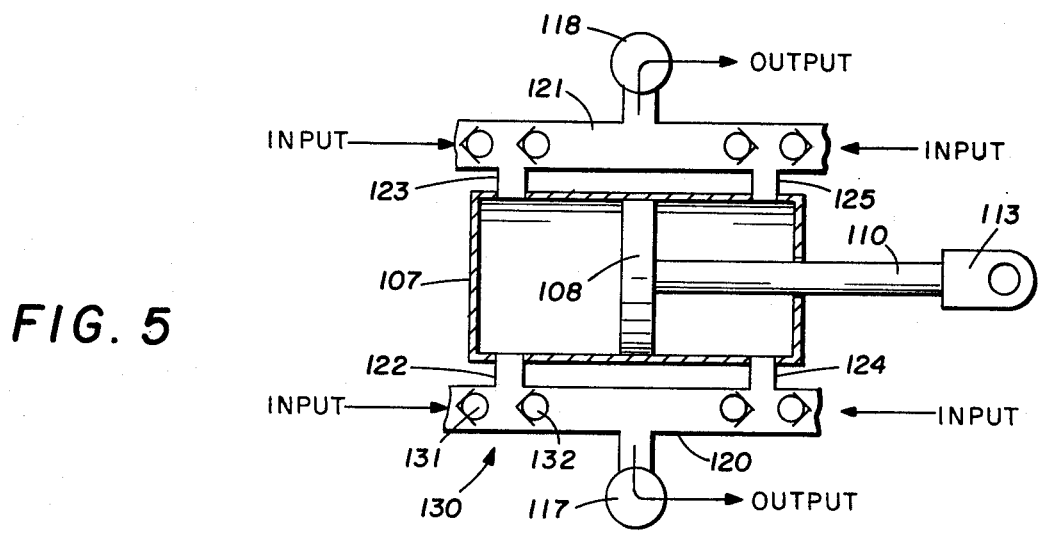
FIG. 5 is a diagrammatic representation of one of the cylinder assemblies of FIG. 3 and of associated fluid conduits.

The pumping apparatus 10 additionally comprises an outlet pipe 116 which communicates with four outlet conduits 117 (FIG. 1) on one side of the pumping assembly 12 and with four corresponding conduits 118 (FIG. 4), aligned with the conduits 117, on the opposite side. Each pair of outlet conduits 117, 118 extends alongside a respective one of the four banks of cylinders 106 of the two pump assemblies 86, 87, and the two outlet conduits 117, 118 of each pair extend vertically on opposite sides of the cylinders, as shown in FIGS. 2 and 4. With reference now to FIG. 5, one of the cylinders 107 of the first bank of cylinders 106 (FIG. 1) is shown in diagrammatic form. An associated pair of outlet conduits, 117, 118, extends vertically alongside the cylinder 107, and first and second, lateral conduits 120, 121, which are open at their opposite end portions, communicate at their mid-portions with the outlet conduits 117, 118. First and second, and third and fourth ducts 122 and 123, and 124 and 125 communicate with the interior of the cylinder 107, the first and second ducts each communicating with one end of the interior of the cylinder 107 and with the first and second lateral conduits 120, 121, respectively, and the third and fourth ducts 124, 125 communicating with the opposite end of the cylinder 107 and with the first and second transverse conduits 120, 121, respectively, at portions thereof on the other sides of their central junctions with the outlet conduits 117 and 118. Within the lateral conduits 120, 121 adjacent each of the four ducts 122, 123, 124, 125 is installed a respective check valve assembly 130, each valve assembly comprising an outer and an inner, unidirectional check valve 131, 132. The outer check valves 131 are positioned adjacent the open end portions of the lateral conduits 120, 121 and are directioned to permit fluid flow into the conduits from their respective, adjacent, open ends. The inner check valves 132 are mounted within the lateral conduits 120, 121 between respective ones of the ducts 122, 123, 124 and 125 and the adjacent intersections of the respective lateral conduits 120, 121 with the respective, associated, branch outlet conduits 117, 118. The unidirectional, inner check valves 132 are directioned to permit fluid flow from the ducts 123 and 125 toward the outlet conduit 118 and to prevent oppositely directed flow, and the inner check valves 132 adjacent the ducts 122, 124 are directioned to permit fluid flow toward the branch conduit 117, and to prevent fluid flow in the opposite direction. Thus, upon the piston 108 moving rightwardly within the cylinder 107, sea water is drawn into the cylinder through the ducts 122, 123 and the outer check valves 131 respectively adjacent the ducts 122, 123, but the inflowing water is prevented from bypassing the ducts 122, 123 by the inner check valves 132 respectively adjacent the ducts 122 and 123. Fluid in the cylinder 107 on the opposite side of the piston 108 is ejected through the ducts 124, 125 and is directioned by the check valves 131, 132 adjacent the ducts 124, 125 into the midportions of the transverse conduits 120, 121, through the branch outlet conduits 117, 118 and into the outlet pipe 116. The provision of dual inlets, the dual ducts 122, 123 and 124, 125 and check valve assemblies 130 at each end of the cylinder 107, provides improved reliability in that, should one of the check valves become jammed in a closed position, the piston can still operate to pump water through the other components, e.g., employing the check valves and lateral conduit 120 or 121 on the opposite side.

Figure 6:
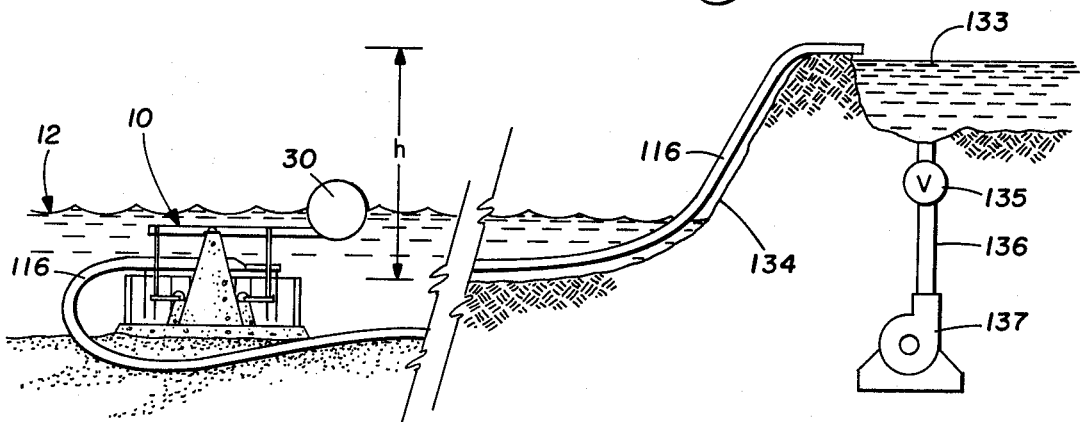
FIG. 6 is a partially diagrammatic view, in a reduced scale, of the pumping apparatus of FIGS. 1 and 2 and of an associated, elevated storage reservoir and hydroelectric generator.

With reference now to FIG. 6, the outlet pipe 116, in the present embodiment communicates with a reservoir 133, the bottom of which is elevated above the inlet end of the pipe 116 by a distance "h." In the present embodiment, the outlet pipe 116 is extended along the floor 11 of the body of water 12 toward the shore 134 and is extended upwardly, over or beneath the shore, to the elevated reservoir 133. The reservoir 133 communicates through a shutoff valve 135 and an outlet conduit 136 with a hydroelectric generating station 137.

In operation, the float 30 floats within and upon the body of water 12, displacing about one half of its total valume. Wave movement which occurs during normal weather conditions, absent unusually high winds, results in vertical displacement of the float which is accommodated by reciprocal movement of the pivotable beam 23 and the associated pumping assemblies 86, 87, and the beam 23 is caused to pivot reciprocally upon its axis 22. As a wave crest approaches the float 30, the rising water surface 24 lifts the float 30, causing counterclockwise rotation of the pivotable beam 23 as viewed in FIG. 1, or movement in a first direction. The first walking beam structure 40 is thus lowered, and the second walking beam structure 41 is pulled upwardly by the beam 23. The downward movement of the first walking beam structure 40 induces counterclockwise rotation of the first crank structure or assembly 53, and the first and second radius arms 44, 45 (FIG. 3) rotate the shaft 55 and pinion gear 64 in a counterclockwise direction. The rotating gear 64 drives the rack 66 and the first driving plate 84 to the right. Because the driving plate 84 is connected to the piston rods 110 of each of the pistons 108 in both the first and second banks of cylinders 106 and 109, each of the ten pistons in the first pump assembly 86 is thereby translated rightwardly within its associated cylinder. Rightward movement of the pistons 108 causes an inflowing of sea water through the leftward ducts 122, 123 (FIG. 5) of each cylinder into the chamber portions to the left of the pistons 108, and causes an ejection of water from the interior portions of the cylinders 107 spaced to the right of the pistons 108, and thereby pumps the water up through the outlet conduits 117, 118, into the outlet pipe 116, and upwardly to the reservoir 133. In the same manner, the downward movement of the second walking beam structure 41 causes similar simultaneous actuation of the second pump assembly 87 and ejection of water through its associated outlet conduits into the outlet pipe 116. The potential energy of the water raised to the level of the reservoir may then be employed to drive a hydroelectric generator 137 positioned below the reservoir 133. It will be apparent to those in the art that mechanical structures other than the rack 66 and pinion 64 could alternatively be employed for driving a horizontally extending reciprocal piston in a cylinder. The present embodiment is preferred, however, because of its facilitation of the use of multiple arrays of pistons and cylinders driven by a single float and reciprocal beam. The positioning of the cylinders 107 in a vertical array extending parallel to the pivotal beam 23 permits the use of multiple, relatively inexpensive, and readily obtainable piston-cylinder assemblies to achieve a substantial pumping capacity which could otherwise be achieved only through the use of excessively large piston-cylinder assemblies, which are difficult and expensive to manufacture. The slideable connecting bars 115 serve to enhance the reliability of the system by ensuring that the driving plates 84, 102 move simultaneously and that excessive forces are not imposed upon one of the two force transmitting mechanisms, e.g., the walking beam structure 40, the crank structure 53, and the driving plate 84. Thus, if there should occur some obstruction to movement of one of the pistons 108 of the first pump assembly 86, the resulting load is not sustained solely by the first walking beam structure, crank structure 53, and driving plate 84, but is also sustained by the second walking beam structure 41 and associated structure acting through the connecting rods 115. Absent this redundancy, it is possible, for example, that sand or other foreign material could cause one of the pinion gears 64 to jam, possibly overstressing portions of the associated actuating mechanisms. It is also possible to employ additional arrays of cylinders and additional driving plates, or equivalent structures, mounted alongside the illustrated components, if additional capacity is desired, or it is alternatively possible to employ fewer components if a pumping system of smaller capacity is desired.

Whereas the vertical column of water and the pumping assemblies 86, 87 provide the load in the illustrated embodiment, it will be seen from the description to follow that the load may take other forms in other embodiments.

With respect now to the problem of sustaining the loads imposed upon structures situated in ocean waters during severe weather conditions, the pumping apparatus 10 embodies a constructional approach opposite that normally employed in ocean mounted structures. That is, prior-art pumping systems are generally supported atop platforms positioned above the surface to avoid possible storm damage to the apparatus and to minimize the corrosive effects of salt spray. In contrast, the outlet pipe and each element of the pumping apparatus 10, except the float 30, is preferably positioned below the surface of the body of water. While, as previously discussed, the water adjacent the surface of a body of water passes through a generally circular path during the passage of a wave, water spaced below the surface is not greatly disturbed even by high waves at the surface. Therefore, the portions of the pumping apparatus 10 spaced below the surface do not receive the force of turbulent waves at the surface. Moreover, during stormy weather, the average surface level also rises, causing the upper portions of the pumping apparatus effectively to become even lower relative to the water surface. Concerning the problem of corrosion, there is less corrosive action upon a metal object which is continuously submerged than upon one which is only occasionally wet from salt water or exposed to spray, since any substantial oxidation of the metal requires the presence of oxygen from the atmosphere. Thus, in the preferred embodiment of the pumping apparatus 10, all components except the float are normally submerged, and the float may readily be coated with an anticorrosive agent.

Concerning the problem of protecting the reciprocal components of the pumping apparatus from violent or excessive movement by high waves during a storm, the walking beam structures 40, 41 and the radius arms 44, 45 of both pump assemblies 86, 87 comprise linkage means connected between the reciprocal beam and the foundation 13 (through piers 62, 63 and 76, 77) for limiting movement of the pivotal, reciprocal beam and float to movement within a positional range extending from a first position, through the medial position as seen in FIG. 1, to a second position. In the first position, the float is raised, e.g., by the crest of a wave, and the first walking beam structure is lowered until the radius arms 44, 45 of the crank structure are directioned generally downwardly and are parallel to the first walking beam structure. In the second position, the float is lowered, and the first walking beam structure is raised until the crank structure radius arms 44, 45 are directioned generally upwardly and are in longitudinal alignment with the first walking beam structure, whereupon they prevent the pivotal beam from further movement in that direction. The circumference of the pinion gear 64 is less than twice the length of the cylinders 107, whereby the pistons are prevented from "bottoming out" against end portions of the cylinders.

Even with these advantageous safety precautions, however, the reciprocal and movable portions of the apparatus 10 would still be susceptible to damage from violent movement of the pistons and other movable elements during sudden and extreme wave movements during heavy seas. Accordingly, means have been provided for opposing movement of the reciprocal beam and associated structures from its medial position toward its first or second position in order to prevent violent movement toward the positional extremes which might damage the reciprocal and movable parts, the seals between the pistons and cylinders, and/or the check valves 131, 132, or which might result in locking the beam in its first or second positions. To achieve this end, the linkage means, comprising the walking beam structures 40, 41 and the radius arms 44, 50, are a part of a driving means (connecting the reciprocal beam structure to the load, or pump assemblies 86, 87) the driving means also including gearing means comprising the crank structures 53, 54 and the associated gear racks 66 and driving plates 84, 102. As will be understood from the discussion to follow, the linkage means, the gearing means, and the load cooperate to prevent wave-induced motion of the reciprocal beam structure 23 to its positional extremes by providing a variable mechanical advantage in the driving mechanism connecting the beam 23 to the load. (Although wave-induced motion of the beam structure provides insufficient force to move it to its positional extremes, it may be so positioned if desired by exertive additional rotational force upon the crank structures.)

The means drivingly connecting the reciprocal structure to the load may also be termed a means opposing pivotal movement of the reciprocal beam 23 with increasing force, as the float member 30 approaches one of its extreme positions, with a force greater than the weight or buoyancy of the float structure. More specifically, the translation of circular movement of the crank structure 53 into linear movement of the driving plate 84 and associated pistons 108 results in a varying mechanical advantage as the radius arms 44, 45 are rotated by vertical movement of the walking beam structures as the beam 23 rotates toward its first and second positions. Thus, as the float is dropped suddenly off the crest of a large wave and the radius arms 44, 45 are suddenly lifted, the opposing force of the load or pumping assemblies resists movement of the pistons 108, and the resistive force is increased by the crank structures 53, 54 as the radius arms 44, 45 approach an upright position parallel to the walking beam structure 40, because of the increased rotational movement per increment of vertical movement of the walking beam structure 40. Stated differently, the crank assemblies and racks (gearing means) and the linkage means including the radius arms 50, 51 provide a variable degree of mechanical advantage between float movement and piston movement which increases as the beam moves toward its median position and decreases substantially as it approaches its first and second, extreme positions, thus protecting the reciprocal mechanism from rapid movement toward the extreme positions, and preventing override of the extreme positions, i.e., rotation of the crank assembly more than 180°. That is, the buoyancy of the float is not sufficient to drive the beam 23 to its first position, and the weight of the float is not sufficient to pull the beam to its second position, so that the beam is effectively limited to a restricted portion of its positional range, and is damped as it approaches the upper and lower portions of the restricted portion. Thus, the float will submerge before it reaches its first position, and will be supported completely out of the water before it reaches its second position.

It will be noted that the linkage means, gearing means, and the load are non-resilient, i.e., they do not depend upon the action of additional, spring return means to oppose movement of the beam. Such spring return means subtract from the force applied to the load, and would be required to be impractically large to effectively resist the large inertial forces produced by waves in storm conditions.

As has been suggested, in the present, illustrated embodiment, the load comprises the pump assemblies 86, 87 and the back pressure exerted against the pistons 108 by the closed, continuous column of water within the outlet pipe 116. In other embodiments, not shown, the outlet pipe 116 may be connected to a turbine driving an electrical generator, in which case the load comprises the frictional forces of the pump assemblies 86, 87 and the resistive forces imparted to fluid flow through the outlet pipe 116 by the generator and turbine. In the present embodiment, the outlets of the cylinders 107 communicate with the column of water within the output pipe 116, and the weight of the column of water within the outlet pipe 116 increases the load factor.

The configuration required to achieve the result of preventing movement of the beam to its extreme positions is dependent upon the float weight (and equal potential buoyancy), the moment arm A between the center of the float and the pivot axis 22, the moment arm B between the pivot axis 22 and either of the walking beam structures, the length R of the radius arms 44, 45, the radius "r" of the pinion gear, the total effective piston area $A_T$ of the pump assemblies 106, 109, and the height and density D of the column of water within the outlet pipe. The mechanical advantage at the median position is provided by the expression:

$$M_A = \frac{A}{B} \times \frac{R}{r}$$

In order to produce sufficient opposing force to prevent the beam from reaching its pivotal extremes, the outlet pipe 116 must extend upwardly to a height $h$ defined as follows, ignoring the effects of momentum and friction:

$$h = \frac{F \times A \times R \times \cos\theta \times \cos\phi}{B \times A_T \times r \times D}$$

where $\theta$ is the angle between the longitudinal axis of the walking beams 40, 40A and a vertical plane, $\phi$ is the angle between the longitudinal axis of the radius arms 44, 45 and a horizontal plane.

EXAMPLE: For h when beam 23 is in the median position: Let F be 100,000 pounds, A be 39.4 feet, R is 5.5 feet, B is 17.9 feet, r is 1.5 feet, D is 64 pounds per cubic foot, $A_T$ is 42.64 square feet, Cos $\theta$ is 1, and Cos $\phi$ is 1 then:

$$h = \frac{100{,}000 \times 39.4 \times 5.5 \times 1 \times 1}{17.9 \times 42.64 \times 1.5 \times 64}$$

$h = 295.7$ feet when in the median position

Example 2 is of $h$ when beam 23 is approaching its restricted pivotal extremes, i.e., the upper and lower limits of the portion of its positional range to which the beam is limited by the gearing and linkage means and the load: Let all of the components remain the same except for Cos $\theta$ which will be 0.997 and Cos $\phi$ which will be 0.809, then:

$$h = \frac{100{,}000 \times 39.4 \times 5.5 \times .997 \times .809}{17.9 \times 42.64 \times 1.5 \times 64}$$

$h = 238.5$ feet

Therefore with the components as in the above examples and with the outlet pipe 116 extending upwardly to a height of 238.5 feet, the beam would have reached its pivotal extremes.

The use of apparatus providing a variable mechanical advantage as described thus prevents excessive and excessively rapid movement of all the movable components, and particularly prevents rapid movement of the movable components toward the positional extremes. The problem of possible sudden impact of the weight of the float against the connecting structures, e.g., the radius arms and the walking beam structures, at the first and second positions is obviated, and overtravel and the possibility of the beam "hanging" in the first or second, extreme positions, is obviated. While the pump is adapted to operate efficiently during average water surface levels, it has sufficient range of movement to permit useful operation when the mean surface level is above or below the average. With respect to the specific example described in Example 2, for instance, it may be computed that the float 30 will be displaced through a vertical distance of approximately 14 feet in spite of the fact that, in the preferred embodiment, the pivotal movement of the beam 23 is limited to only a portion of its potential pivotal movement for prevention of any possibility of damage to the reciprocal components, as discussed previously, from rapid or violent movement toward the pivotal extremes. Accordingly, vertical movement, from both waves and tides, may be readily accommodated by the present system in locations wherein average tides are experienced, and fully useful, wave-induced motion of the float is permitted unless the water surface rises to a level sustantially above or below its mean, mid-tide level. Moreover, as will be appreciated by those in the art, the dimensions of the component parts may be altered if desired to accommodate greater tidal extremes, the invention, of course, not being limited in scope to the specific embodiments discussed herein.

It will now be apparent that the pumping apparatus eliminates many of the disadvantages and limitations present in prior pumping systems of the wave powered type. It is particularly suited for use when it is desired to minimize the required maintenance of such systems, and does not require the presence of human operators or attendants. Nevertheless, it is not of excessively expensive manufacture, since conventional cylinder-piston assemblies of moderate size are employed, and the need for expensive corrosion resistant materials is eliminated. Moreover, no large, supporting platform positioned at a substantial height above the mean water surface level is needed. The pump is efficiently operable even during most severe weather conditions (in all but those in which an unusually high tide rises over the float in its uppermost position) and the reciprocal components need not be immovably locked or otherwise secured during weather extremes. During storm conditions in which excessively high tides are experienced, the float becomes completely submerged, as has been previously discussed, before it reaches the first position, in the case of the preferred embodiment, and at the first position in the case of the more general case. Accordingly, as a storm intensifies and the water level rises, the turbulence of the water below the surface and adjacent the pumping apparatus decreases. This is a result of the principle discussed initially, in the present specification, that wave-produced motion decreases as the depth below the water surface increases. Thus, the pumping apparatus is protected from storm damage during excessively high tides, but is operable during a wide range of normal tide conditions.

While only one embodiment of the invention, together with modifications thereof, has been described in detail herein and shown in the accompanying drawings, it will be evident that various modifications are possible in the arrangement of its components without departing from the scope of the invention.

What is claimed is:

1. A wave powered pumping system adapted for use within a body of water subject to wave motion and adapted to be secured to a foundation fixedly mounted beneath the water surface, the system comprising:

a support structure affixed to the foundation and extending upwardly therefrom toward the water surface;

a beam pivotally connected to the upwardly extending support structure adjacent its upper end for pivotal movement, about a horizontal pivot axis, between first and second extremes of pivotal movement;

a float structure connected to the beam at a location thereon spaced from the pivot axis and adapted to float upon the body of water for causing pivotal movement of the beam as the float structure rises and falls upon the water surface during normal wave motion, the beam having horizontal extension from the pivot axis;

fluid pumping means, having an outlet and having an inlet having communication with the body of water, immovably located relative to the foundation at a location continuously below the surface of the body of water, the fluid pumping means comprising at least one cylinder having a piston reciprocally mounted therein;

power transmitting means, comprising at least one walking beam structure rotatably connected to the beam at a location spaced from the pivot axis and extending downwardly from the beam, below the water surface and operatively connected to the at least one piston of the pumping means, for reciprocally driving the piston; and non-resilient means, including the power transmitting means, for opposing movement of the beam toward its first and, alternatively, toward its second extreme of pivotal movement with a force which increases as the beam approaches its first, and alternatively, its second extreme of pivotal movement, the increase in force being sufficient to prevent movement of the beam to a respective one of its positional extremes, the means opposing movement of the beam comprising means providing relatively little resistance to reciprocal movement of the float through a mid-range which corresponds to movement of the float upon waves naturally occurring during moderate weather conditions, the means opposing movement of the beam to its positional extremes comprising a rotatable crank assembly having a pinion gear, a driving plate means being provided in connection with the at least one reciprocal piston and mounted for slideable movement with the piston, a linear rack being provided mounted horizontally upon a portion of the driving plate means and drivingly engaged with the pinion gear, the walking beam structure being drivingly connected to the crank assembly.

2. A wave powered system of a type adapted for use within a body of water subject to wave motion, the system comprising:

a support structure adapted to be mounted within the body of water;

a float;

a reciprocal structure connected to the float and movably connected to the support structure, the reciprocal structure comprising means permitting the float to rise and fall upon the water surface, relative to the support structure, in response to wave motion, the reciprocal structure comprising means adapted to move in a first direction in response to upward driving forces of the float, derived from its buoyancy, as the water surface rises, and to move in a second direction, in response to downward driving forces derived from the weight of the float, as the water surface falls;

a load;

means drivingly connecting the reciprocal structure to the load and including linkage means, connected between the reciprocal structure and the support structure, for limiting movement of the reciprocal structure to a positional range extending between a first position corresponding to a raised position of the float and a second position corresponding to a lowered position of the float, a medial position lying between the first and second positions, and further including gearing means, connected between the linkage means and the load, for driving the load in response to movement of the reciprocal structure and the linkage means, the linkage means and the gearing means comprising means for transmitting driving force from the reciprocal structure to the load with a variable mechanical advantage which decreases, as the reciprocal structure approaches its first position, to a degree wherein at a position between the medial and first positions of the reciprocal structure, the resistive force of the load becomes equal to the driving force derived from buoyancy of the float when the float is fully submerged, the linkage means, gearing means, and the load comprising means preventing movement of the reciprocal structure to its first position in response to wave-induced, upward motion of the float, the linkage means and gearing means also comprising means for transmitting driving force in the opposite direction from the reciprocal structure to the load with a variable mechanical advantage which decreases, as the reciprocal structure approaches its second position, to a degree wherein at a position between the medial and second positions of the reciprocal structure, the resistive force of the load becomes equal to the driving force, derived from the weight of the float when the water surface has dropped below the float, the linkage means, gearing means, and the load comprising means preventing movement of the reciprocal structure to its second position in response to wave-induced, downward motion of the float.

3. A wave powered pumping system of a type adapted for use within a body of water subject to wave motion, the system comprising:

a support structure adapted to be mounted within the body of water;

a float;

a reciprocal beam connected to the float and movably connected to the support structure, the beam comprising means pivotally movable about a transverse, horizontally extending axis spaced from the float, for permitting the float to rise and fall upon the water surface relative to the support structure in response to wave motion;

a load;

means drivingly connecting the beam to the load and including linkage means, connected between the beam and the support structure, for limiting pivotal movement of the beam to a positional range extending between first and second positions, a medial position lying between the first and second positions, the level of the float as the beam approaches its first position being raised relative to that when the beam is in its medial position, the float being lowered, relative to the medial position, as the beam approaches its second position, the linkage means including a walking beam structure pivotally connected to the beam at a position thereon spaced from the pivotal axis of the beam and extending downwardly therefrom, the linkage means also including a linkage arm rotatably connected to the support structure, for pivotal movement about a horizontal axis, and pivotally connected at its opposite end portion to the walking beam structure, the linkage arm extending generally perpendicularly toward the walking beam structure when the reciprocal beam is in its medial position, the means drivingly connecting the beam to the load also including a gearing means, the linkage arm being drivingly connected to the gearing means, the linkage means and the gearing means comprising a means transmitting driving force to the load with a variable mechanical advantage which decreases, as the beam approaches its first, and alternatively, its second positions, to a degree wherein the resistive force of the load becomes equal to the driving forces derived from wave induced motion of the float before the float reaches one of the positional extremes otherwise permitted by the linkage means.

* * * * *